United States Patent
Naito et al.

(10) Patent No.: US 6,496,354 B2
(45) Date of Patent: Dec. 17, 2002

(54) MULTILAYER CAPACITOR

(75) Inventors: Yasuyuki Naito, Takefu; Masaaki Taniguchi, Fukui-ken; Yoichi Kuroda, Fukui; Takanori Kondo, Sabae, all of (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 8 days.

(21) Appl. No.: 10/073,076

(22) Filed: Feb. 12, 2002

(65) Prior Publication Data

US 2002/0109958 A1 Aug. 15, 2002

Related U.S. Application Data

(63) Continuation of application No. 09/672,743, filed on Sep. 28, 2000, which is a continuation of application No. 09/517,971, filed on Mar. 3, 2000, which is a continuation of application No. 09/040,891, filed on Mar. 18, 1998, now Pat. No. 6,034,864.

(30) Foreign Application Priority Data

Nov. 14, 1997 (JP) .............................. 9-313206

(51) Int. Cl.$^7$ ................................................. H01G 4/228
(52) U.S. Cl. ............................... 361/306.1; 361/306.3; 361/309; 361/313
(58) Field of Search ........................... 361/306.1, 306.3, 361/309, 313, 302, 303, 307, 308.1, 310, 311, 312, 321.2–321.5

*Primary Examiner*—Anthony Dinkins
(74) *Attorney, Agent, or Firm*—Keating & Bennett, LLP

(57) ABSTRACT

First and second external terminal electrodes are formed on the same principal surface of a capacitor main body. The connection between first internal electrodes in the capacitor main body, the first external terminal electrode and the mutual connection between the plurality of first internal electrodes is achieved by a first connection portion. The connection between second internal electrodes, the second external terminal electrode and the mutual connection between the plurality of second internal electrodes is achieved by a second connection portion. The first and second connection portions are arranged alternately. Currents flow through the connection portions in opposite directions with the result that components of magnetic flux generated by such currents are cancelled and the ESL is reduced.

52 Claims, 5 Drawing Sheets

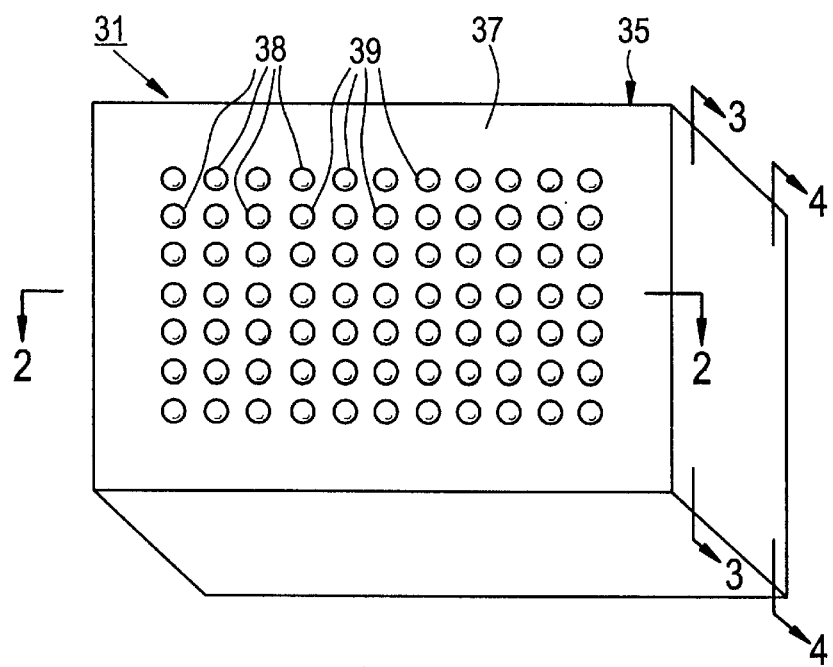
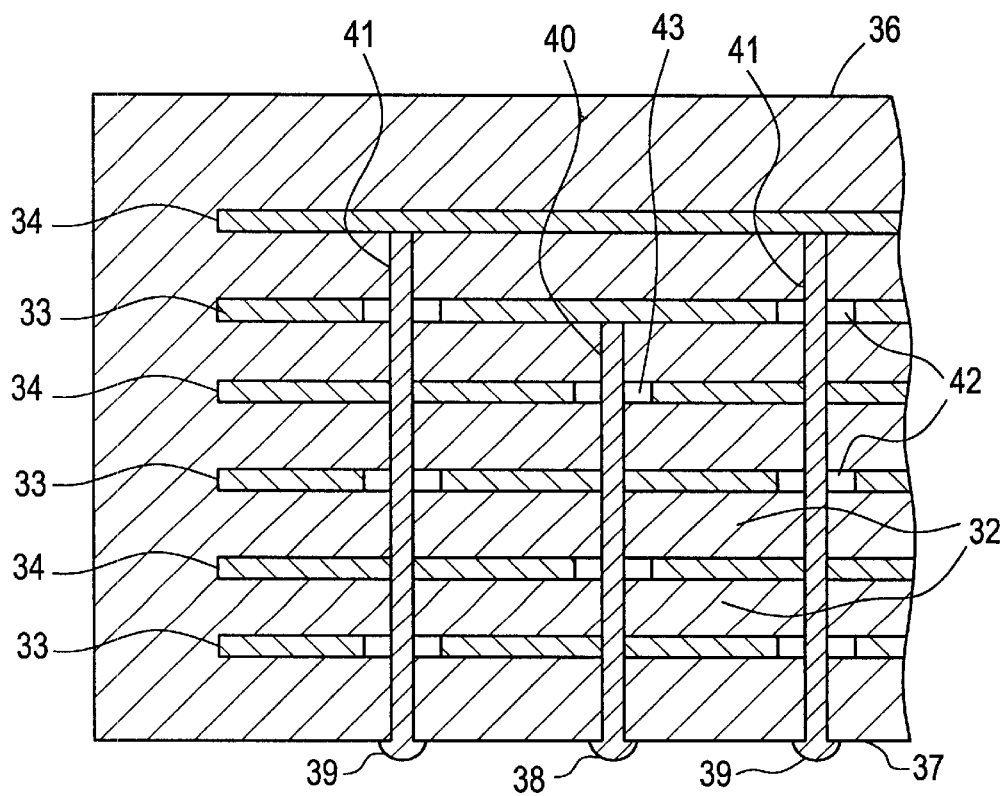

MULTILAYER CAPACITOR

This is a Continuation Application of U.S. patent application Ser. No. 09/672,743, filed Sep. 28, 2000, now U.S. Pat. No. 6,370,011 currently, which is a Continuation Application of U.S. patent application Ser. No. 09/517,971, filed Mar. 3, 2000, now abandoned, currently, which is a Continuation Application of U.S. patent application Ser. No. 09/040,891, filed on Mar. 18, 1998, now U.S. Pat. No. 6,034,864.

BACKGROUND OF THE INVENTION

1. Field of the Invention

The present invention relates to a multilayer capacitor and, more particularly, to a multilayer capacitor which can be advantageously used in high frequency circuits.

2. Description of the Related Art

FIG. 7 shows a schematic sectional view of a typical prior art multilayer capacitor 1 which includes a main body 5 having a plurality of ceramic dielectric material layers 2 stacked one on top of the other. A set of first internal electrodes 3 and a set of second internal electrodes 4 are arranged alternately, with a respective dielectric material layer 2 located between adjacent pairs of electrodes 3 and 4 to form a plurality of capacitor units.

Each of the first internal electrodes 3 is electrically coupled to a first external terminal electrode 8 formed on a first end face 6 of the main body 5. Each of the second internal electrodes 4 is electrically coupled to a second external electrode 9 formed on a second end surface 7 of main body 5. As a result, the electrostatic capacities respectively provided by the plurality of capacitor units are connected in parallel by the first and second external terminal electrodes 8 and 9.

The multilayer capacitor 1 shown in FIG. 7 exhibits a problem which is discussed below.

FIG. 9 is a schematic sectional plan view showing one of the electrodes 3 of FIG. 7. In this figure, arrows indicate the path and direction of typical currents 22 which flow in each of the first internal electrodes 3 of the multilayer capacitor 1. In the state shown (the directions of the currents alternate over time when an AC signal is applied to the capacitor), the currents 22 flow from the second external electrode 9 to the second internal electrodes 4 (not shown in FIG. 9), vertically to the first internal electrodes 3 through the dielectric material layers 2 and then to the first external terminal electrode 8 through the first internal electrodes 3. There is a general flow of currents in both internal electrodes 3 and 4 from right to left, i.e., in the same direction, as seen in FIG. 9.

As is well known, the current 22 induces a magnetic flux in a direction determined by the direction of the current 22, thereby producing a self-inductance component. Since the currents 22 flow in the longitudinal direction of the internal electrodes 3, the multilayer capacitor 1 produces relatively high equivalent series inductance (ESL) and may fail to function properly in a high frequency band when it is used as a decoupling capacitor or bypass capacitor.

This problem is partly overcome using the structure shown schematically in FIG. 8. This structure is described in Japanese unexamined patent publication No. H7-201651.

Like the multilayer capacitor 1 shown in FIG. 7, the multilayer capacitor 11 includes a main body 15 having a plurality of dielectric material layers 12 stacked one on top of the other. A plurality of first internal electrodes 13 and a plurality of second internal electrodes 14 are arranged on respective dielectric material layers 12 to form pairs of overlapping electrodes, each pair of overlapping electrodes being separated by a respective dielectric material layer 12 such that a plurality of capacitor units are formed.

In this multilayer capacitor 11, first and second external terminal electrodes 18 and 19 are formed, respectively, on first and second principal surfaces 16 and 17 extending in parallel with the internal electrodes 13 and 14.

A plurality of first connection portions 20, which are electrically isolated from second internal electrodes 14, are provided to electrically connect the first internal electrodes 13 to both the first external terminal electrode 18 and to each other.

A plurality of second connection portions 21, which are electrically isolated from first internal electrodes 13, are provided to electrically connect the second internal electrodes 14 to both the second external terminal electrode 19 and each other.

Thus, the electrostatic capacities provided by the plurality of the capacitor units formed by the respective pairs of internal electrodes 13 and 14 are coupled in parallel by the connection portions 20 and 21 and are combined at external terminal electrodes 18 and 19, respectively.

Compared to the prior art capacitor of FIG. 7, the multilayer capacitor 11 shown in FIG. 8 reduces the equivalent series inductance (ESL) and is suitable for use in a high frequency band.

In FIG. 10, the arrows indicate the path and direction of typical currents 23 which flow in, for example, the first internal electrodes 13 of the multilayer capacitor 11. In the state shown (the directions of the currents alternate over time when an AC signal is applied to the capacitor), the currents 23 flow from the second internal electrodes 14 (not shown in FIG. 10) in a face-to-face relationship with the first internal electrodes 13 to the first internal electrodes 13 through the second connection portions 21. Then, most of the currents flow to the nearest first connection portion 20 and further to the first external terminal electrode 18 through the first connection portion 20.

When such a flow of the currents 23 is viewed with attention to the area around the connection portions 20 or 21, since the currents 23 flow in various directions, components of magnetic flux produced by the currents 23 are advantageously canceled by each other to suppress the generation of net magnetic flux. Further, since the lengths of the paths of the currents 23 flowing through the internal electrodes 13 or 14 are limited to the intervals between adjacent connection portions 20 and 21, the lengths of each of the current paths is relatively short and, therefore, the self-inductance components produced are reduced.

However, the reduction of the ESL in the multilayer capacitor 11 is achieved only for components of magnetic flux induced by the currents 23 in the direction in which the internal electrodes 13 and 14 extend. FIG. 11 is an enlarged view of a part of the multilayer capacitor 11 shown in FIG. 8, in which currents 24 and 25 flowing respectively through the connection portions 20 and 21 of the multilayer capacitor 11 are indicated by the dashed arrows.

Referring to FIG. 11, when currents flow, for example, from the second external terminal electrode 19 to the first external terminal electrode 18, upwardly directed currents 24, 25 flow through both the first connection portions 20 and through the second connection portions 21, respectively.

The currents 24 flowing through the first connection portion 20 and the currents 25 flowing through the second connection portion 21 produce respective components of magnetic flux 26 and 27, as shown in FIG. 12. The currents flowing through the respective connection portions 20 and 21 flow from the back side to the front side of the plane of FIG. 12 (i.e., they flow out of the page). The direction of the resultant components of magnetic flux 26 and 27 oppose one another in the areas between the connection portions 20 and 21. As a result, the magnetic flux is canceled between and connection portions 20 and 21.

The magnetic flux 28 that surrounds the components of magnetic flux 26 and 27, however, is not cancelled. Rather, the magnetic flux 28 tends to be greater than each individual magnetic flux 26, 27 and, therefore, increases the ESL.

As a result, the components of magnetic flux 26 and 27 produced by the currents 24 and 25 flowing through the connection portions 20 and 21 are not effectively canceled and increase the self-inductance of the capacitor 11. Thus, the ESL is not sufficiently reduced and high frequency performance is not sufficiently improved.

SUMMARY OF THE INVENTION

In order to solve the above-described technical problems, a multilayer capacitor according to the present invention comprises a capacitor body; m pair of first and second generally planar internal electrodes located in said capacitor body, each said pair of internal electrodes being separated by a respective dielectric layer to define a respective capacitive unit, m being a positive integer greater than or equal to one. The multilayer capacitor also comprises n first external electrodes located on a first surface of said capacitor body, n being an integer greater than or equal to 1; p second external electrodes located on said first surface of said capacitor body, p being an integer greater than or equal to 1; n first connection portions operable to electrically connect said first internal electrodes to each other and to a respective one of said first external electrodes, each of said first connection portions being electrically insulated from said second internal electrodes; and p second connection portions operable to electrically connect said second internal electrodes to each other and to a respective one of said second external electrodes, each of said second connection portions being electrically insulated from said first internal electrodes.

According to the invention, the first and second connection portions are arranged such that they are not more than about 2 mm from each other. Preferably, they are not positioned more than about 1 mm apart. In other words, the interval between the first and second connection portions is preferably as small as possible.

Further, according to the invention, it is preferable that a plurality of first and second connection portions are provided.

In the preferred embodiment of the invention described above, the plurality of first connection portions and the plurality of second connection portions are more preferably arranged such that the connection portions nearest to each of the first connection portion are second connection portions.

More preferably, the plurality of first connection portions and the plurality of second connection portions are alternately arranged.

Further, the first and second internal electrodes are preferably disposed in a substantially square configuration and are rounded in the areas of the four corners of the square. Still further, each of the first and second connection portions preferably has a substantially round configuration, and the roundness at the corners of the first and second internal electrodes is provided as an arc which is substantially concentric with the sectional configuration of the first or second connection portions which are nearest to the relevant corners.

Moreover, according to the invention, the first and second external terminal electrodes are preferably in a substantially point-like configuration.

In a preferred embodiment of the invention, a plurality of first and second internal electrodes are provided such that they are alternately arranged in the stacking direction of the dielectric material layers; the first connection portion further extends through the second internal electrodes to electrically connect the plurality of first internal electrodes to each other; and the second connection portion further extends through the first internal electrodes to electrically connect the plurality of second internal electrodes to each other.

BRIEF DESCRIPTION OF THE DRAWINGS

For the purpose of illustrating the invention, there is shown in the drawing a form which is presently preferred, it being understood, however, that the invention is not limited to the precise arrangement and instrumentality shown.

FIG. 1 is a perspective view of a multilayer capacitor 31 according to a first embodiment of the invention.

FIG. 2A is a more detailed view of dashed area 2A of FIG. 2.

DETAILED DESCRIPTION OF THE PREFERRED EMBODIMENT

Figure 2:
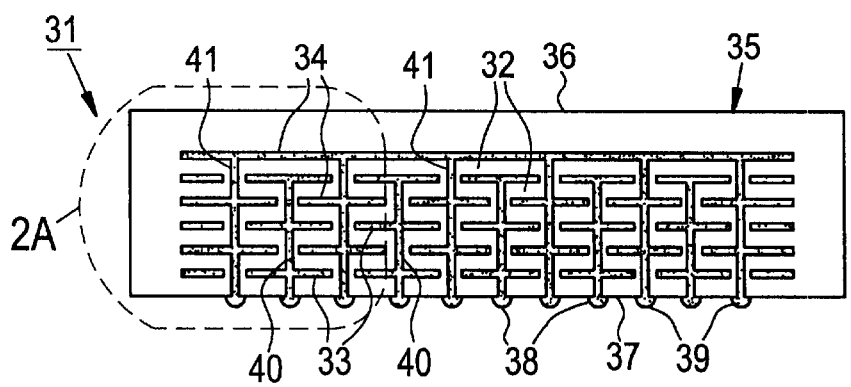
FIG. 2 is a schematic cross section of the capacitor 31 taken along lines 2—2 of FIG. 1.

Referring now to the drawing wherein like numerals indicate like elements, there is shown in FIGS. 1 through 4 a multilayer capacitor constructed in accordance with the principles of the present invention and designated generally as 31.

The multilayer capacitor 31 includes a capacitor main body 35 having a plurality of dielectric material layers 32 (FIGS. 2, 2A) preferably made of a ceramic dielectric material and a plurality of pairs of opposed first and second internal electrodes 33 and 34, each such pair of opposing internal electrodes having a dielectric material layer 32 interposed therebetween, so as to form a plurality of capacitor units.

The capacitor main body 35 may be manufactured, for example, by forming internal electrodes 33 and 34 on a plurality of ceramic green sheets, stacking them one on top of the other, and the pressing and cutting the ceramic green sheets to obtain raw chips each having a size corresponding to one capacitor main body 35 and then baking them.

Figure 8:
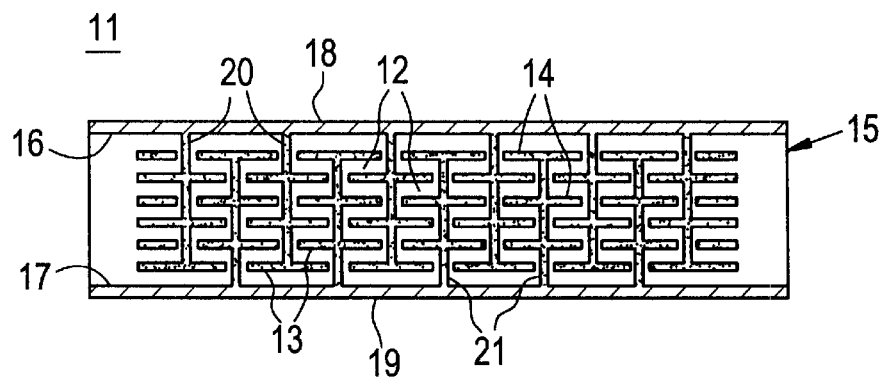
FIG. 8 is a front schematic view of another conventional multilayer capacitor 11 which shows an internal structure thereon in the form of a vertical section.
Figure 9:
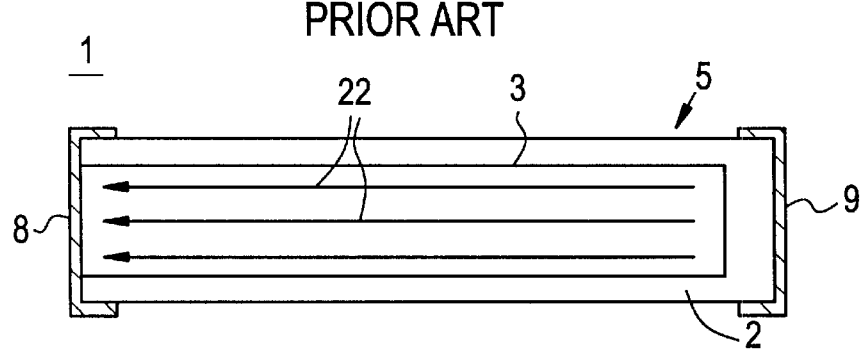
FIG. 9 is a schematic view illustrating currents 22 flowing through internal electrodes 3 of the multilayer capacitor 1 taken along lines 9—9 of FIG. 7.

Like the multilayer capacitor of FIG. 8, the multilayer capacitor 31 electrically couples the first and second internal electrodes using a plurality of connection portions 40, 41. Unlike the multilayer capacitor of FIG. 8, the external electrodes 38, 39 coupled to connection portions 40, 41, respectively, are formed on the same outer surface 37 of the capacitor body 35 to ensure counter current flow in connection portions 40, 41 and thereby to reduce the ESL.

Figure 3:
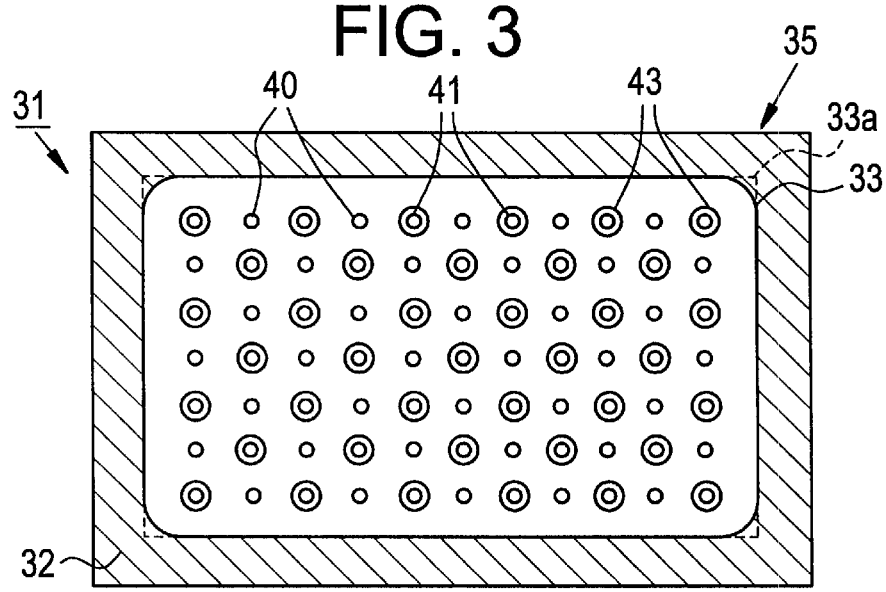
FIG. 3 is a schematic cross sectional view of the multilayer capacitor 31 shown in FIG. 1 taken along lines 3—3 of FIG. 1 which shows a first internal electrode 33.

As best shown in FIGS. 2 and 2A (where FIG. 2A is a detailed cross-sectional view of the schematic cross-section of multilayer capacitor 31 shown in FIG. 2), the first connection portions 40 extend through the dielectric layers 32 are electrically coupled to each of the first internal electrodes 33. As best shown in FIGS. 2A and 3, first connection portions 40 pass through openings 42 in the second internal electrodes 34 and are electrically insulated therefrom.

Figure 4:
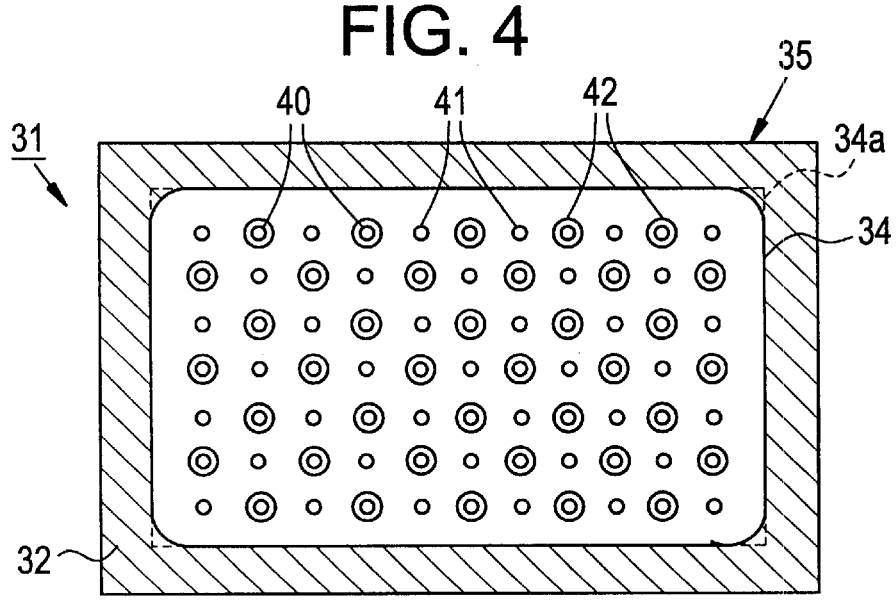
FIG. 4 is a cross sectional view of the multilayer capacitor 31 shown in FIG. 1 taken along lines 4—4 of FIG. 1 which shows a second internal electrode 34.

In a similar manner, second connection portions 41 extend through the dielectric layers 32 and are electrically coupled to each of the second internal electrodes 34. As best shown in FIGS. 2A and 4, second connection portions 41 pass through openings 43 in the first internal electrodes 34 and are electrically insulated therefrom.

The connection portions 40 and 41 may be formed, for example, by forming holes in the ceramic green sheets before they are laminated together and filling the holes with conductive paste before they are stacked one on top of the other.

Figure 10:
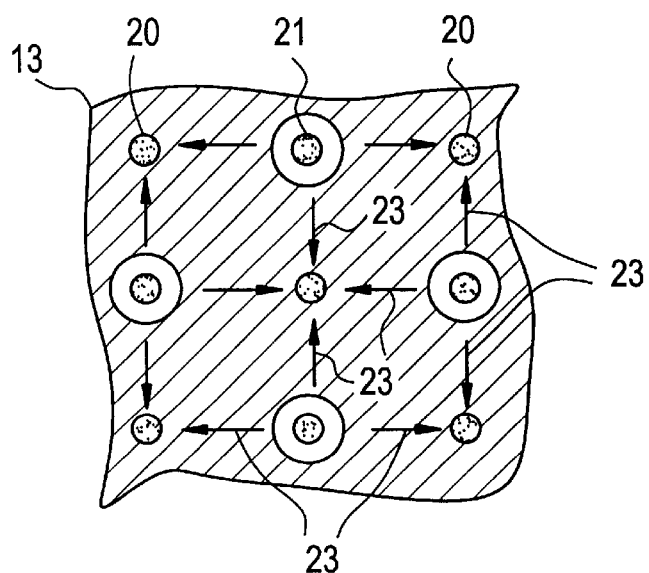
FIG. 10 is a partial cross sectional view illustrating currents 23 flowing through internal electrodes 13 of the multilayer capacitor 11 shown in FIG. 8.

In the present embodiment, currents flow through internal electrodes 33 and 44 in substantially the same manner as the prior art of FIG. 8 (i.e., as shown in FIG. 10). Since the currents flow in various directions in the region around each of the connection portions 40 and 41, components of magnetic flux produced by the currents are advantageously canceled and the generation of a net magnetic flux is suppressed. Further, since the lengths of the paths of the currents flowing through the internal electrodes 33 and 34 are limited to the intervals between adjacent connection portions 40 and 41, each of the current lengths are relatively short and, therefore, the self-inductance components produced at such intervals is reduced.

Further, as best shown in FIGS. 3 and 4, the first and second internal electrodes 33 and 34 of the present embodiment have a substantially rectangular configuration. In the preferred embodiment, the regions of the four corners of the rectangule are rounded with an arc which is substantially concentric with the center of the first or second connection portions 40 and 41 which are nearest to the relevant corner. Thus, the distance between the edge at each of the corners of the first and second internal electrodes 33 and 34 and the first or second connection portion 40 and 41 nearest to the corner is smaller than when the corners are not rounded. This also results in a reduction of the current length and contributes to a reduction in the ESL.

Where it is not necessary to minimize the inductance, the electrodes may be replaced with internal electrodes 33a and 34a whose corners are not rounded as indicated by the imaginary lines in FIGS. 3 and 4.

Figure 5:
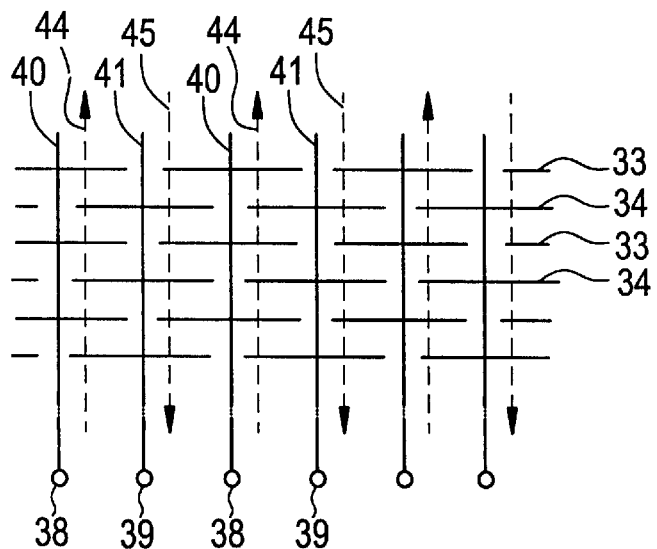
FIG. 5 is a schematic view of the multilayer capacitor 31 shown in FIG. 1 which illustrates currents 44 and 45 flowing through first and second connection portions 40 and 41 thereof, respectively.
Figure 11:
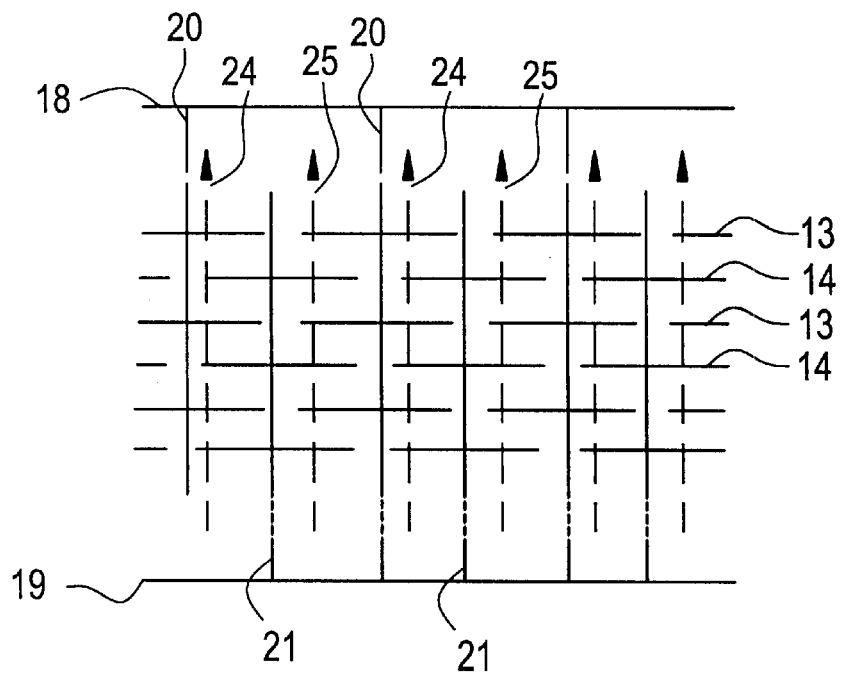
FIG. 11 is a schematic view of the multilayer capacitor 11 shown in FIG. 8 illustrating currents 24 and 25 flowing through first and second connection portions 20 and 21, respectively.
Figure 12:
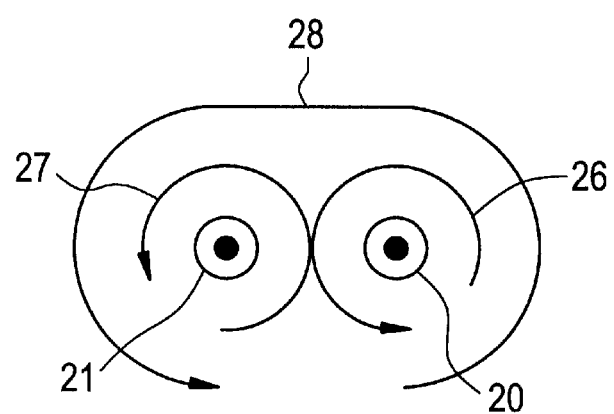
FIG. 12 is a schematic view illustrating components of magnetic flux 26 and 27 induced by the currents flowing through the first and second connection portions 20 and 21 shown in FIG. 11, respectively.

FIG. 5 is an enlarged schematic view of a part of the multilayer capacitor 31 shown in FIG. 2. It is a view corresponding to FIG. 11 in which the dashed arrows indicate currents 44 and 45 flowing through the connection portions 40 and 41 of the multilayer capacitor 31, respectively.

When a current flows, for example, from the first external terminal electrode 38 to the second external terminal electrode 39, upward currents 44 flow through the first connection portions 40 while downward currents 45 flow through the second connection portions 41. That is, the currents 44 flowing through the first connection portions 40 flow in the opposite direction with respect to the currents 45 flowing through the second connection portions 41.

Figure 6:
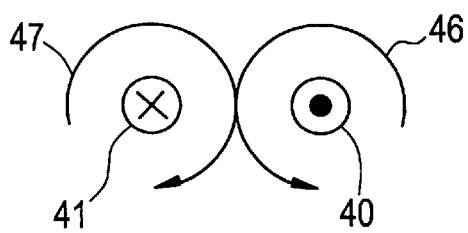
FIG. 6 is a schematic view illustrating components of magnetic flux 46 and 47 induced by the currents flowing through the first and second connection portions 40 and 41 shown in FIG. 5, respectively.

As a result, the respective currents 44 and 45 flowing through the first and second connection portions 40 and 41 (FIG. 6) produce respective components of magnetic flux 46 and 47 which are in opposite directions. In FIG. 6, the currents 44 flowing through the first connection portions 40 flows from the back side to the front side of the plane of the paper, and the currents 45 flowing through the second connection portions 41 flow from the front side to the back side of the plane of the paper.

Therefore, the components of magnetic flux 46 and 47 are effectively canceled by each other outside the connection portions 40 and 41. The components of magnetic flux 46 and 47 extend in the same direction in the areas between the connection portions 40 and 41 and, therefore, overlap with each other in these limited areas. However, since these areas are relatively small, they have only a limited magnetic flux density with the result that the components of magnetic flux 46 and 47 are effectively canceled by each other when viewed as a whole.

In order to improve the degree of the cancellation between the components of magnetic flux 46 and 47 described above, it is preferable that the intervals (or distances) between the first and second connection portions 40 and 41 be small, preferably about 2 mm or less. Even better results are achieved if the intervals are about 1 mm or less.

Thus, the present embodiment makes it possible to effectively cancel the components of magnetic flux induced by the currents which flow through internal electrodes 33 and 34 and those which flow through connection portions 40 and 41. Therefore, it is possible to suppress the ESL of the multilayer capacitor 31 to a higher degree than is possible in the conventional multilayer capacitor 11 shown in FIG. 8.

Figure 7:
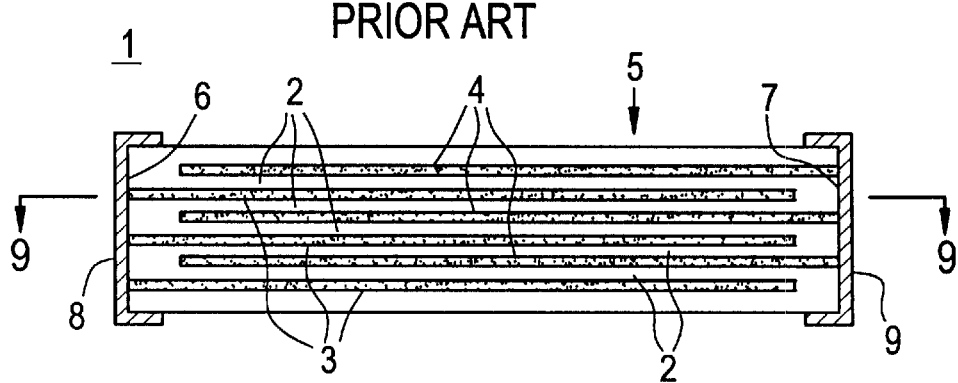
FIG. 7 is a front schematic view of a conventional multilayer capacitor 1 which shows an internal structure thereof in the form of a vertical section.

Samples of the multilayer capacitor 31 according to the present embodiment ("present embodiment"), the conventional multilayer capacitor 1 shown in FIG. 7 ("comparative example 1") and the conventional multilayer capacitor 11 shown in FIG. 8 ("comparative example 2") were fabricated and their ESLs were evaluated.

In each of the samples, the outer dimensions of the internal electrodes were 5 mm×5 mm and a total of forty (40) internal electrodes were stacked one on top of the other. In the present embodiment and the comparative example 2, the first and second connection portions were provided so as to form five rows and five columns totalling twenty-five (25) connection portions. The intervals between each of the first and second connection portions (the center lateral distance between each pair of adjacent connection portions) was 1 mm.

The ESL of each sample was obtained using the resonance method. The resonance method is a method wherein the impedance frequency characteristics of each sample multilayer capacitor is measured and the ESL is obtained by measuring a frequency $f_0$ at a minimum resonance point (referred to as the series resonance point of the capacitance component $C_3$ and the ESL of the capacitor). The following equation is then used to calculate the ESL:

$$ESL=1/[(2\pi f_0)^2 \times C_3]$$

The measured value of ESL of each of the samples is shown in Table 1 below.

TABLE 1

|  | ESL Value (pH) |
| --- | --- |
| Present Embodiment | 26 |
| Comparative Example 1 | 590 |
| Comparative Example 2 | 73 |

It is apparent from Table 1 that the ESL was reduced more effectively with the structure of the present embodiment than with the structure of either of the comparative examples 1 or 2. While it is apparent that the components of magnetic flux induced by currents flowing through the internal electrodes of the comparative example 2 was canceled more efficiently than in the comparative example 1, it will be understood that it had a high self-inductance compared to the present embodiment. This is because the currents in comparative example 2 flow through the first and second connection portions in the same direction. Conversely, the currents in the present embodiment flow through the first and second connection portions in opposite directions.

To determine the best arrangement of the connection portions 40, 41 of the present invention, additional tests were conducted. In each of the test samples, a multilayer capacitor 31 was fabricated with the same number of stacked layers using the same method of fabrication. Four samples 1 through 4 were fabricated in which the arrangement of the connection portions 40 and 41 was changed, i.e., the numbers of the rows and columns and the intervals (spacing) of the connection portions 40 and 41 were changed as shown in Table 2 (below). In each of these samples, the interval between the outermost connection portions and the peripheral edges of the inner electrodes was fixed at 0.5 mm in order to eliminate, to the degree possible, the effect of any variation of this interval.

For the samples 1, 3 and 4, the outer dimensions of each internal electrode were fixed, e.g., at 5 mm×5 mm and the internal of the connection portions was varied as shown in Table 2. The sample 4 corresponds to the embodiment shown in FIGS. 1–4. For the sample 2, the outer dimensions of each internal electrode were made smaller than those of sample 1 (i.e., 4 mm×4 mm), and the number of the connection portions was set at "2×2" such that an interval of 3 mm was obtained as shown in Table 2.

Table 2 shows an ESL value measured for each of the above-described samples using the resonance method.

TABLE 2

|  | Row × Column | Interval (mm) | ESL Value (pH) |
| --- | --- | --- | --- |
| Sample 1 | 2 × 2 | 4 | 360 |
| Sample 2 | 2 × 2 | 3 | 340 |
| Sample 3 | 3 × 3 | 2 | 58 |
| Sample 4 | 5 × 5 | 1 | 26 |

As apparent from Table 2, changes in the arrangement of the connection portions, especially changes in the interval therebetween, cause changes in the path lengths of the currents flowing through the internal electrodes and, therefore, the strength of the components of magnetic flux induced thereby is likewise altered. This accounts for the differences between the measured ESL values for the samples. While an interval between the connection portions of 3 mm or more (as in samples 1 and 2) provides a less significant reduction in ESL, an interval of 2 mm or less (as in samples 3 and 4) results in a significant reduction of the ESl value due to the cancellation of the components of magnetic flux. The result is even more favorable when the interval is 1 mm or less, as in sample 4.

While the present invention has been described by way of example with reference to the illustrated embodiment, it is possible to change: the number of the internal electrodes, the number and positions of the connection portions, and the number and positions of the external terminal electrodes and still remain within the scope of the invention. Further, the type of the dielectric material used for the dielectric layers and the type of the conductive material used for the internal electrodes and external terminal electrodes may be changed as appropriate.

As described above, a multilayer capacitor according to the present invention comprises a capacitor main body including a plurality of dielectric material layers which are stacked one on top of the other and at least a pair of first and second internal electrodes which are in a face-to-face relationship with each other with dielectric material layers interposed therebetween. First and second external terminal electrodes are formed on one principal surface of the capacitor main body extending parallel to the plane of the internal electrodes. A first connection portion penetrates through the dielectric material layers such that it electrically connects the first internal electrodes and the first external terminal electrode while being electrically isolated from the second internal electrodes. A second connection portion is disposed adjacent to the first connection portion and penetrates through the dielectric material layers such that it electrically connects the second internal electrodes and the second external terminal electrodes while being electrically isolated from the first internal electrodes.

As a result, by directing the currents in each of the internal electrodes in various directions around the connection portions, components of magnetic flux can be effectively canceled and the lengths that the currents must flow can be shortened to suppress the ESL. In addition, since both of the first and second external terminal electrodes are formed on the same principal surface of the capacitor main body, the currents flowing through the first connection portions flow in a direction opposite to those that flow through the adjacent second connection portions. This makes it possible to effectively cancel the components of magnetic flux induced by the currents flowing through the connection portions, and to further reduce the ESL.

As a result, a high resonance frequency can be achieved, and the capacitor can be used in a high frequency circuit.

Accordingly, a multilayer capacitor according to the invention can be used in electronic circuits operating at higher frequencies and can be advantageously used as a bypass capacitor or decoupling capacitor in a high frequency circuit. Because of the low ESL, the invention will function as a quick power supply supplying power from electricity stored in the capacitor when there is a sudden need for power, for example, during power-up. As such, the invention can be used as a decoupling capacitor in a CPU (microprocessing unit).

According to the invention, the degree to which magnetic flux is cancelled in the capacitor is significantly improved when the interval between the first and second connection portions is 2 mm or less. The degree of the magnetic flux cancellation is further improved as the interval is reduced to 1 mm or less which allows the ESL value to be reduced to 30 pH or less.

For high speed CPU's, operation in excess of 1 GHz are being studied. There is a need for decoupling capacitors having an ESL value of 30 pH or less which has been unachievable in the prior art for use in the vicinity of such processor units. A multilayer capacitor according to the invention can sufficiently satisfy such a need because its ESL can be reduced to 30 pH or less.

According to the invention, when plurality of first and second connection portions are provided, it is possible to more easily direct the currents in each internal electrodes in various directions around the connection portions connected thereto and to shorten the lengths of the current paths.

When the connection portions are arranged such that each first connection portion is located closest to a corresponding second connection portion, the magnetic flux components induced by the currents flowing through the connection portions can be canceled more effectively. When the plurality of first and second connection portions are arranged alternately, the most effective cancellation of magnetic flux components can be achieved.

When the shape of the internal electrodes are substantially square with rounded corners, the distance between the corner edge of the internal electrodes and the connection portion located closest to the corner edge can be minimized versus when the corner is not rounded. This functions to further reduce the lengths of the current paths and, therefore, contribute further to the reduction of the ESL.

This effect can be further enhanced by forming each of the first and second connection portions with a substantially circular cross-section and by forming the rounded corners of the internal electrodes in an arc which is substantially concentric with the circular cross-section of the connection portion nearest to the corner.

Furthermore, when the first and second external terminal electrodes of the invention are bump-like in shape, a bump connection can be advantageously used to mount the multilayer capacitor to a circuit board. There is a trend toward the use of such bump connections in semiconductor chips (such as CPUs, "flip chips" or the like), which chips have higher operational frequencies. The configuration of the external terminal electrodes as described above is consistent with the trend. Such bump connection allows mounting with a high density and makes it possible to suppress the generation of inductance components at the connections.

In addition, while a plurality of first and second internal electrodes are alternately arranged in the stacking direction of the dielectric material layers in order to increase the electrostatic capacity provided, the above-described effects can be achieved in a multilayer capacitor having such an increased capacity by forming the first connection portions such that they do not electrically connect the second internal electrodes but electrically connect the plurality of first internal electrodes to each other and by forming the second connection portions such that they do not electrically connect the first internal electrodes but electrically connect the plurality of second internal electrodes to each other.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A capacitor comprising:
    a capacitor body made of a dielectric material and having two major surfaces opposed to each other and a plurality of side surfaces disposed between the two major surfaces;
    a plurality of electrode layers disposed in the dielectric material of the capacitor body and being arranged such that the plurality of electrode layers are disposed substantially parallel to the two major surfaces of the capacitor body;
    at least one first internal electrode having a first polarity and at least two second internal electrodes having a second polarity opposite to the first polarity and arranged substantially perpendicular to the two major surfaces of the capacitor body, the at least one first internal electrode and the at least two second internal electrodes are arranged such that the at least one first internal electrode is adjacent to the at least two second internal electrodes;
    at least one external electrode disposed on one of the two major surfaces of the capacitor body; wherein
    the capacitor body includes a first section in which the at least one first internal electrode and the at least two second internal electrodes are located and a second section in which at least one of the at least one first internal electrode and the at least two second internal electrodes are not located, and the second section is defined by a portion of the capacitor body that is located closed to one of the two major surfaces.

2. The capacitor according to claim 1, wherein each of the at least one first internal electrode and the at least two second internal electrodes are not located in said second section.

3. The capacitor according to claim 1, wherein the first section and the second section are horizontal sections divided by an imaginary horizontal line extending substantially parallel to the two major surfaces of the capacitor body.

4. The capacitor according to claim 1, further comprising a plurality of external electrodes disposed on said one of the two major surfaces of the capacitor body and each of the at least one first internal electrode and the at least two second internal electrodes are connected to a respective one of the plurality of external electrodes.

5. The capacitor according to claim 1, further comprising a plurality of the first internal electrodes having the first polarity and a plurality of the second internal electrodes having the second polarity, the plurality of first and second internal electrodes being arranged substantially perpendicular to the two major surfaces of the capacitor body and such that each of the plurality of first internal electrodes is located adjacent to at least one of the plurality of second internal electrodes.

6. The capacitor according to claim 1, further comprising a plurality of the first internal electrodes having the first polarity and a plurality of the second internal electrodes having the second polarity, the plurality of first and second internal electrodes being arranged substantially perpendicular to the two major surfaces of the capacitor body and such that at least one of the first internal electrodes is surrounded by at least four of the plurality of second internal electrodes.

7. The capacitor according to claim 6, further comprising a plurality of external electrodes disposed on said one of two major surfaces of the capacitor body, wherein the plurality of external electrodes are arranged such that one of said plurality of external electrodes connected to one of the plurality of first internal electrodes is adjacent to another of said plurality of external electrodes connected to one of the plurality of second internal electrodes.

8. The capacitor according to claim 6, further comprising a plurality of external electrodes disposed on said one of the two major surfaces of the capacitor body, wherein the plurality of external electrodes are arranged such that one of said plurality of external electrodes connected to one of the plurality of first internal electrodes is surrounded by at least four of said plurality of external electrodes connected to respective ones of the plurality of second internal electrodes.

9. The capacitor according to claim 1, further comprising a plurality of external electrodes disposed on said one of the two major surfaces of the capacitor body, a plurality of the first internal electrodes having the first polarity and a plurality of the second internal electrodes having the second polarity, the plurality of first and second internal electrodes being arranged substantially perpendicular to the two major surfaces of the capacitor body and electrically connected to a respective one of the plurality of external electrodes.

10. The capacitor according to claim 1, wherein at least one of the at least one first internal electrode and the at least two second internal electrodes are exposed at only said one of the two major surfaces of the capacitor body.

11. The capacitor according to claim 1, further comprising a plurality of external electrodes disposed on said one of the two major surfaces of the capacitor body, wherein the external electrodes are arranged in a matrix configuration on said only one of the two major surfaces of the capacitor body.

12. The capacitor according to claim 1, further comprising a plurality of external electrodes disposed on said one of the two major surfaces of the capacitor body, wherein the plurality of external electrodes have a substantially rounded configuration and are arranged to achieved bump bonding connection.

13. The capacitor according to claim 1, further comprising a plurality of external electrodes disposed on said one of two major surfaces of the capacitor body, wherein the plurality of electrode layers each have a plurality of holes therein, and the at least one first internal electrode and the at least two second internal electrodes extend through respective ones of the plurality of holes in the plurality of electrode layers.

14. The capacitor according to claim 13, further comprising a plurality of external electrodes disposed on said one of the two major surfaces of the capacitor body, wherein the plurality of electrode layers have a substantially rectangular plate configuration.

15. The capacitor according to claim 1, further comprising a plurality of external electrodes disposed on said one of the two major surfaces of the capacitor body, wherein the plurality of external electrodes include a plurality of first polarity external electrodes and a plurality of second polarity electrodes arranged in a matrix configuration on said one of the two major surfaces of the capacitor body.

16. The capacitor according to claim 1, further comprising a plurality of first internal electrodes and a plurality of second internal electrodes disposed adjacent to respective ones of the plurality of first internal electrodes.

17. The capacitor according to claim 1, further comprising a plurality of first internal electrodes and a plurality of second internal electrodes and a plurality of external electrodes disposed on said one of the two major surfaces of the capacitor body, wherein at lest four of the plurality of external electrodes are arranged in rows and columns and are electrically connected to respective ones of the plurality of first and second internal electrodes.

18. The capacitor according to claim 1, wherein the capacitor is arranged to define a decoupling capacitor for a multiprocessing unit.

19. The high frequency circuit according to claim 18, wherein the at least one capacitor is arranged to define one of a bypass capacitor and a decoupling capacitor.

20. A high frequency circuit comprising at least one capacitor according to claim 1.

21. A circuit board comprising at least one capacitor according to claim 1.

22. A capacitor comprising:

a capacitor body made of a dielectric material and having two major surfaces opposed to each other and a plurality of side surfaces disposed between the two major surfaces;

a plurality of electrode layers disposed in the dielectric material of the capacitor body and being arranged such that the plurality of electrode layers are disposed substantially parallel to the two major surfaces of the capacitor body;

at least one first internal electrode having a first polarity and at least two second internal electrodes having a second polarity opposite to the first polarity and arranged substantially perpendicular to the two major surfaces of the capacitor body, the at least one first internal electrode and the at least two second internal electrodes are arranged such that the at least one first internal electrode is adjacent to the at least two second internal electrodes;

at least one external electrode disposed on one of the two major surfaces of the capacitor body; wherein the capacitor body includes a first section in which the at least one first internal electrode and the at least two second internal electrodes are located and a second section in which at least one of the at least one first internal electrode and the at least two second internal electrodes are not located, and both the at least one first terminal electrode and the at least two second internal electrodes extend from the first section to the one of the two major surfaces of the capacitor body.

23. The capacitor according to claim 22, wherein each of the at least one first internal electrode and the at least two second internal electrodes are not located in said section.

24. The capacitor according to claim 22, wherein the first section and the second section are horizontal sections divided by an imaginary horizontal line extending substantially parallel to the two major surfaces of the capacitor body.

25. The capacitor according to claim 22, further comprising a plurality of external electrodes disposed on said one of the two major surfaces of the capacitor body and each of the at least one first internal electrode and the at least two second internal electrodes are connected to a respective one of the plurality of external electrodes.

26. The capacitor according to claim 22, further comprising a plurality of the first internal electrodes having the first polarity and a plurality of the second internal electrodes having the second polarity, the plurality of first and second internal electrodes being arranged substantially perpendicular to the two major surfaces of the capacitor body and such that each of the plurality of first internal electrodes is located adjacent to at least one of the plurality of second internal electrodes.

27. The capacitor according to claim 22, further comprising a plurality of the first internal electrodes having the first polarity and a plurality of the second internal electrodes having the second polarity, the plurality of first and second internal electrodes being arranged substantially perpendicular to the two major surfaces of the capacitor body and such that at least one of the first internal electrodes is surrounded by at least four of the plurality of second internal electrodes.

28. The capacitor according to claim 27, further comprising a plurality of external electrodes disposed on said one of the two major surfaces of the capacitor body, wherein the plurality of external electrodes are arranged such that one of said plurality of external electrodes connected to one of the plurality of first internal electrodes is adjacent to another of said plurality of external electrodes connected to one of the plurality of second internal electrodes.

29. The capacitor according to claim 27, further comprising a plurality of external electrodes disposed on said one of the two major surfaces of the capacitor body, wherein the plurality of external electrodes are arranged such that one of said plurality of external electrodes connected to one of the plurality of first internal electrodes is surrounded by at least four of said plurality of external electrodes connected to respective ones of the plurality of second internal electrodes.

30. The capacitor according to claim 22, further comprising a plurality of external electrodes disposed on said one of the two major surfaces of the capacitor body, a plurality of the first internal electrodes having the first polarity and a plurality of the second internal electrodes having the second polarity, the plurality of first and second internal electrodes being arranged substantially perpendicular to the two major surfaces of the capacitor body and electrically connected to a respective one of the plurality of external electrodes.

31. The capacitor according to claim 22, wherein at least one of the at least one first internal electrode and the at least two second internal electrodes are exposed at only said one of the two major surfaces of the capacitor body.

32. The capacitor according to claim 22, further comprising a plurality of external electrodes disposed on said one of the two major surfaces of the capacitor body, wherein the external electrodes are arranged in matrix configuration on said only one of the two major surfaces of the capacitor body.

33. The capacitor according to claim 22, further comprising a plurality of external electrodes disposed on said one of the two major surfaces of the capacitor body, wherein the plurality of external electrodes have a substantially rounded configuration and are arranged to achieve bump bonding connection.

34. The capacitor according to claim 22, further comprising a plurality of external electrodes disposed on said one of the two major surfaces of the capacitor body, wherein the plurality of electrode layers each have a plurality of holes therein, and the at least one first internal electrode and the at least two second internal electrodes extend through respective ones of the plurality of holes in the plurality of electrode layers.

35. The capacitor according to claim 34, further comprising a plurality of external electrodes disposed on said one of the two major surfaces of the capacitor body, wherein the plurality of electrode layers have a substantially rectangular plate configuration.

36. The capacitor according to claim 22, further comprising a plurality of external electrodes disposed on said one of the two major surfaces of the capacitor body, wherein the plurality of external electrodes include a plurality of first polarity external electrodes and a plurality of second polarity external electrodes arranged in a matrix configuration on said one of the two major surfaces of the capacitor body.

37. The capacitor according to claim 22, further comprising a plurality of first internal electrodes and a plurality of second internal electrodes disposed adjacent to respective ones of the plurality of first internal electrodes.

38. The capacitor according to claim 22, further comprising a plurality of first internal electrodes and a plurality of second internal electrodes and a plurality of external electrodes disposed on said one of the two major surfaces of the capacitor body, wherein at least four of the plurality of external electrodes are arranged in rows and columns and are electrically connected to respective ones of the plurality of first and second internal electrodes.

39. The capacitor according to claim 22, wherein the capacitor is arranged to define a decoupling capacitor for a multiprocessing unit.

40. A high frequency circuit according to claim 39, wherein the at least one capacitor is arranged to define one of a bypass capacitor and a decoupling capacitor.

41. A high frequency circuit comprising at least one capacitor according to claim 22.

42. A circuit board comprising at least one capacitor according to claim 22.

43. A high frequency circuit comprising at least one capacitor according to claim 42.

44. A circuit board comprising at least one capacitor according to claim 42.

45. A high frequency circuit comprising at least one capacitor according to claim 44.

46. A circuit board comprising at least one capacitor according to claim 44.

47. A capacitor comprising:
a capacitor body made of a dielectric material and having two major surfaces opposed to each other and a plurality of side surfaces disposed between the two major surfaces;
a plurality of electrode layers disposed in the dielectric material of the capacitor body and being arranged such that the plurality of electrode layers are disposed substantially parallel to the two major surfaces of the capacitor body;
at least one first internal electrode having a first polarity and at least two second internal electrodes having a second polarity opposite to the first polarity and arranged substantially perpendicular to the two major surfaces of the capacitor body, the at least one first internal electrode and the at least two second internal electrodes are arranged such that the at least one first internal electrode is adjacent to the at least two second internal electrodes; and
at least two external electrodes disposed on at least one of the two major surfaces of the capacitor body.

48. The capacitor according to claim 42, wherein the capacitor is arranged to define a decoupling capacitor for a multiprocessing unit.

49. The high frequency circuit according to claim 43, wherein the at least one capacitor is arranged to define one of a bypass capacitor and a decoupling capacitor.

50. A capacitor comprising:

a capacitor body made of a dielectric material and having two major surfaces opposed to each other and a plurality of side surfaces disposed between the two major surfaces;

a plurality of electrode layers disposed in the dielectric material of the capacitor body and being arranged such that the plurality of electrode layers are disposed substantially parallel to the two major surfaces of the capacitor body;

at least one first internal electrode having a first polarity and at least two second internal electrodes having a second polarity opposite to the first polarity and arranged substantially perpendicular to the two major surfaces of the capacitor body, the at least one first internal electrode and the at least two second internal electrodes are arranged such that the at least one first internal electrode is adjacent to the at least two second internal electrodes; and at least one first external electrode connected to the at least one first internal electrode and at least one second external electrode connected to the at least two second internal electrodes, the at least one first external electrode and the at least one second internal electrode are disposed on one of the two major surfaces of the capacitor body.

51. The capacitor according to claim 44, wherein the capacitor is arranged to define a decoupling capacitor for a multiprocessing unit.

52. The high frequency circuit according to claim 51, wherein the at least one capacitor is arranged to define one of a bypass capacitor and a decoupling capacitor.

* * * * *